United States Patent [19]

Delloye

[11] Patent Number: 4,505,872
[45] Date of Patent: Mar. 19, 1985

[54] COMPONENT FOR CONNECTING A PRIMARY PUMP AND A DELIVERY PIPE IN A BREEDER REACTOR OF THE SWIMMING-POOL TYPE

[75] Inventor: N. Delloye, Jeumont, France
[73] Assignee: Jeumont-Schneider, Puteaux, France
[21] Appl. No.: 346,401
[22] Filed: Feb. 8, 1982
[30] Foreign Application Priority Data Feb. 9, 1981 [FR] France .................. 81 02456

[51] Int. Cl.³ .................................. G21D 1/04
[52] U.S. Cl. ........................ 376/203; 415/136; 415/138; 376/285; 376/402
[58] Field of Search .............. 277/22, 26; 376/203, 376/204, 402, 403, 404, 405, 291, 292, 285; 415/134, 136, 138

[56] References Cited

U.S. PATENT DOCUMENTS

| 3,422,766 | 1/1969 | Conibeer | 415/134 |
| 3,807,772 | 4/1974 | Delisle et al. | 376/292 |
| 4,101,148 | 7/1978 | Lee | 376/203 |

FOREIGN PATENT DOCUMENTS 916895  1/1963  United Kingdom .............. 376/203

Primary Examiner—Harvey E. Behrend
Assistant Examiner—Richard W. Wendtland
Attorney, Agent, or Firm—Rines and Rines Shapiro and Shapiro

[57] ABSTRACT

The present invention pertains to a means of connecting a primary pump (intended for sodium or the like) and the delivery pipe within a breeder reactor of the swimming-pool type, permitting limited movement of the pump and the pipe in relation to one another to occur, while also maintaining adequate sealing between low pressure areas and high pressure areas within said pump. The connecting component consists of a cylindrical sleeve (11) which, in a resting position, is situated along the same axis (1) as the delivery pipe for the pump. A cylindrical guide (3) which is fastened to the pump is fitted into the aforementioned pipe, and a sealing joint (13) is situated between the sleeve (11) and the guide (3). There is also a horizontal annular collar (12) which is fastened to the aforementioned sleeve (11), resting upon an annular rim (5) situated upon the upper flange (7) of the pipe (4). The lower surface of the collar (12) contains sockets (13') which are arranged so as to constitute a hydrostatic thrust block.

2 Claims, 1 Drawing Figure

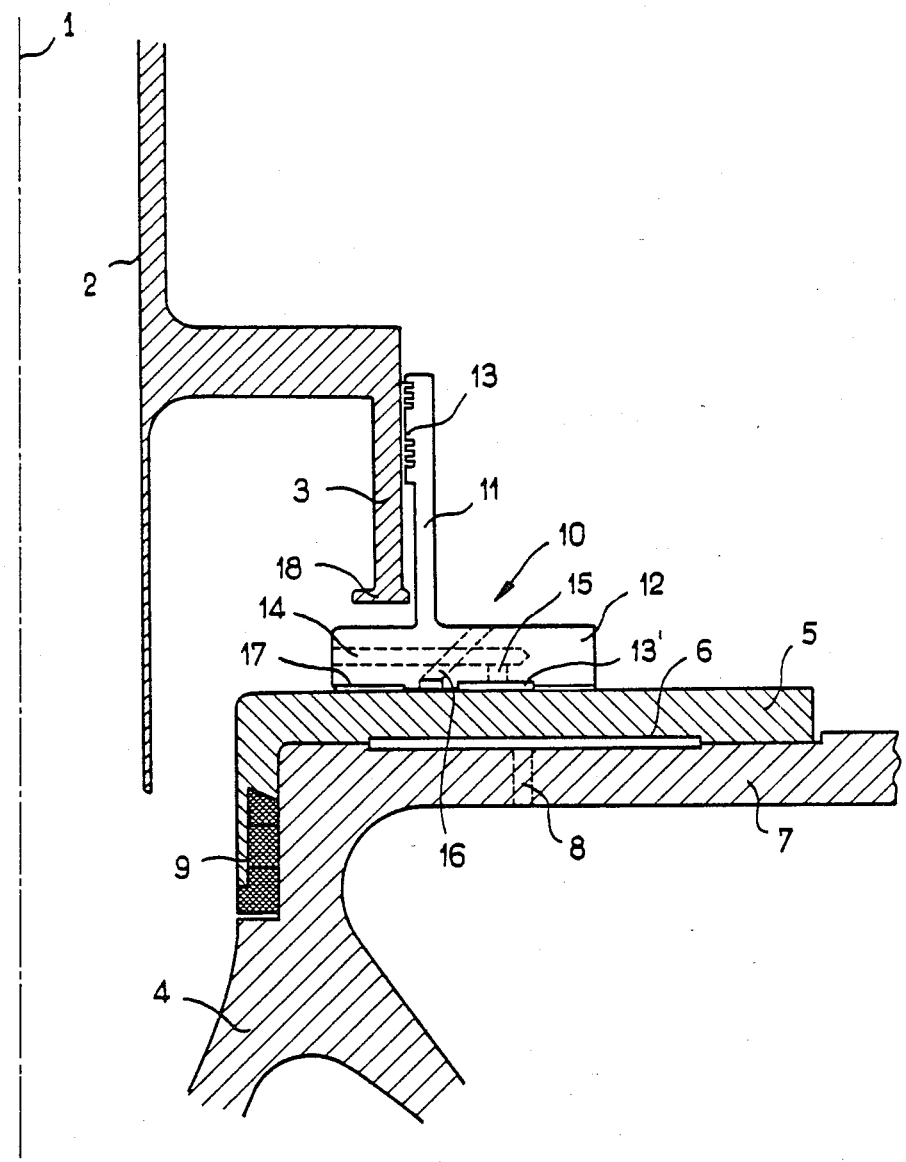

COMPONENT FOR CONNECTING A PRIMARY PUMP AND A DELIVERY PIPE IN A BREEDER REACTOR OF THE SWIMMING-POOL TYPE

The present invention pertains to breeder reactors of the swimming-pool type, which include a primary pump particularly intended for sodium, being more particularly directed to improvements in delivery pipes fitted to such pumps.

The aforementioned arrangement is frequently employed within certain types of nuclear reactors, it being known that when primary pumps for breeder reactors of the swimming-pool type are to be installed within reactors, it is preferable to fit them within delivery pipes by means of connecting components which must provide adequate sealing between the portion of the pump where high pressure exists, namely the delivery area, and the portion of the pump where low pressure exists, namely the intake area, whereas a certin degree of clearance must be allowed at the same time, in order to permit movement of the pump and the pipe in relation to one another, especially on account of differences in temperature for different sections and on account of mechanical effects.

In low-powered breeder reactors, the connecting component consists of a double-jointed cylindrical sleeve, the length-diameter ratio of which permits an extremely limited freedom of horizontal movement. In breeder reactors intended for higher levels of power (of the order of 1,200 MW), it is not possible to employ a sleeve of this type, inasmuch as the length is unsuitable. Hence, in this instance, the pump must be suspended over the sealing slab for the reactor by means of a flexible attachment, and the pump is then fitted inside the pipe. Nevertheless, a solution of this type does not furnish an adequate range of freedom in terms of the design of the pump.

An object of the present invention, accordingly, is to provide a new and improved delivery pipe-to-primary pump connector for breeder reactors and the like that obviates difficulties of this type.

A further object is to provide a novel connector component of more general use, as well.

Other and further objects will be explained hereinafter and are more particularly delineated in the appended claims.

In summary, in accordance with the invention, the means of connection comprises a cylindrical sleeve which, in a resting position, is situated along the same axis as the delivery pipe for the pump, with its inner diameter slightly greater than the outer diameter of a cylindrical guide fastened to the pump in such a manner that the pump can be fitted within said sleeve, with a sealing joint being situated between the sleeve and the cylindrical guide. The means of connection also includes a horizontally situated annular collar attached to the aforementioned sleeve and positioned along the same axis as said sleeve, with the collar resting upon an annular flange and with the lower surface of the flange containing sockets, in order that it may constitute a hydrostatic thrust bearing for receiving fluid discharged by the pump.

It is preferable for the aforementioned annular collar to be attached to the upper flange of the pipe, so as to permit relative movements resulting from localized temperature differences. For this purpose, an annular chamber connected to the low pressure section of the pump is situated between the slab and the upper flange on the pipe.

The invention itself, as well as other functions, advantages, and characteristics of the same, can be more fully understood on the basis of the following description of non-restrictive illustration of an application of the invention, shown in the accompanying drawing, the single figure of which is a transverse section or a cut-away axial view, depicting a component which connects the pump and the delivery pipe in accordance with the present invention.

In reference to the aforementioned drawing, the axis (1) of the pump is represented by the vertical dash-dot line at the left, with the inner wall (2) of the pump demarcating the delivery section. In the instance of breeder reactors, the fluid usually consists of liquid sodium. A cylindrical guide (3) is attached to the pump, which is suspended by means of any suitable type of suspension, not specifically shown in the drawing. This volume therefore constitutes a high pressure section.

The delivery pipe (4) is outfitted with an annular rim (5), which is situated upon the upper flange (7) of the pipe. In this example of the drawing, the said annular rim (5) is positioned in a manner which permits a certain degree of relative movement as a result of localized differences in temperature among various sections of the delivery pipe. Accordingly, an annular chamber (6) is disposed between the annular rim (5) and the upper flange (7), with the chamber (6) being connected to a low pressure area by means of a channel (8), in order that excessive temperature gradients may be eliminated by homogenization. A joint (9) furnishes sufficient sealing between the high pressure area and the previously mentioned chamber (6). The means of connection (10) consists of a cylindrical sleeve (11) which is fastened to a horizontal annular collar (12), both disposed along the same axis (1) as the pump.

The inner diameter of the sleeve (11) is made slightly greater than the outer diameter of the parallel guide (3), in order that the pump may be fitted into the connecting component (10). A joint (13) is attached to the upper portion of the aforementioned sleeve (11), in order to permit adequate sealing between the high pressure section and the low pressure section.

In the example shown, the said joint (13) is a joint of the circular labyrinth type, although other types are useable.

The sleeve (11) permits horizontal and vertical movement of the pump and the pipe in relation to one another, as well as slight angular shifting.

The collar (12) is designed so as to constitute a hydrostatic thrust block. Indeed, the principal form of mechanical stress affecting the connecting component consists of vertical force resulting from the mass of this component and from pressure, and it is necessary to prevent critical friction between the connecting component and the rim (5) during horizontal movement of the pump and the pipe in relation to one another.

The sockets (13) located along the inner surface of the collar (12) receive pressurized fluid from the delivery pipe for the pump by means of ducts (14) and sprayers (15). Fluid released by the sockets is collected within low pressure ducts (16) which are connected to the intake column of the pump. A joint (17), for example a joint of the flat circular labyrinth type, provides adequate sealing between these ducts (16) and the delivery section of the pump.

As can be observed, the connecting component designed in accordance with the invention is supported by a hydrostatic layer of fluid which permits elimination of any undesired friction during operation of the pump. Furthermore, significant horizontal and vertical movement is possible for a pump which is installed upon a slab intended to seal the reactor. Nevertheless, vertical movement is restricted by a thrust block (18) which is fastened to the guide (3), whereas angular movement is restricted by the clearance between the body of the sleeve (11) and the aforementioned thrust block (18). In the same manner, horizontal movement is restricted by the inner wall of the pipe and by the shape of the annular rim (5).

Lastly, this particular means of connection renders installation of a pump within the delivery pipe extremely easy.

Although only one version of the present invention has been described, and the important application to breeder reactors and the like, it is obvious that other applications and modifications may be introduced by those skilled in the art with such not departing from the scope of this invention as defined in the appended claims.

What is claimed is:

1. In a liquid metal-cooled pool-type breeder reactor having a primary pump connected to a source of liquid metal and a delivery pipe connected to said pump by means of a connecting component, said connecting component being free to move relative to the pump and the pipe while providing adequate sealing between low pressure and high pressure sections of the pump and permitting limited relative movement to occur between the pump and the pipe radially, axially, and angularly, said connecting component having, in combination, a cylindrical sleeve substantially coaxial with the delivery pipe in a resting position, a cylindrical guide secured to the pump parallel to the sleeve and extending into the sleeve with sufficient clearance therebetween to permit said angular movement, a sealing joint disposed between the sleeve and the guide and permitting said axial and angular movements, an annular collar attached to the sleeve and resting upon an annular rim connected to an upper end of the pipe, hydrostatic thrust block means including first socket means disposed within a lower surface of the collar and connected by sprayer and duct means to the high pressure section of the pump so as to receive fluid discharged from the pump and including second socket means disposed within the lower surface of said collar, said first and second socket means being connected by a leakage flowpath, said second socket means being connected to further duct means for conducting that fluid into a low pressure region leading to the pump, and a sealing joint disposed at said lower surface of the collar and providing sealing between the high pressure section of the pump and said further duct means.

2. A system according to claim 1, wherein said annular rim is supported upon a flange at said upper end of the pipe for limited radial movement, there being a chamber between a lower surface of the rim and an upper surface of the flange connected by a channel to a relatively low pressure region and there being a sealing joint between a portion of the rim and the pipe providing sealing between the high pressure section of the pump and the chamber.

* * * * *